(12) United States Patent
Tascillo et al.

(10) Patent No.: US 10,450,981 B2
(45) Date of Patent: Oct. 22, 2019

(54) THERMAL ENGINE ENCAPSULATION DIAGNOSTIC

(71) Applicant: Ford Global Technologies, LLC, Dearborn, MI (US)

(72) Inventors: Mark Anthony Tascillo, Canton, MI (US); Thomas G. Leone, Ypsilanti, MI (US); Kenneth James Miller, Canton, MI (US); William Charles Ruona, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 214 days.

(21) Appl. No.: 15/614,761

(22) Filed: Jun. 6, 2017

(65) Prior Publication Data
US 2018/0347493 A1    Dec. 6, 2018

(51) Int. Cl.
| F02D 41/22 | (2006.01) |
| F02D 41/14 | (2006.01) |
| B60H 1/00 | (2006.01) |
| F02B 77/11 | (2006.01) |
| F02B 77/08 | (2006.01) |

(52) U.S. Cl.
CPC ..... *F02D 41/1401* (2013.01); *B60H 1/00492* (2013.01); *B60H 1/00499* (2019.05); *F02D 41/22* (2013.01); *F02B 77/083* (2013.01); *F02B 77/11* (2013.01); *F02D 2200/021* (2013.01); *F02D 2250/14* (2013.01)

(58) Field of Classification Search
CPC ............... F02D 41/1401; F02D 41/222; B60H 1/00492; G01K 1/16; H02J 3/008; F02B 77/11

USPC ............................. 701/107, 112; 123/198 D
See application file for complete search history.

(56) References Cited

U.S. PATENT DOCUMENTS

| 3,864,908 A | 2/1975 | LaHaye |
| 4,924,818 A | 5/1990 | Linden |
| 4,924,826 A | 5/1990 | Vinson |
| 5,377,112 A | 12/1994 | Brown, Jr. et al. |
| 5,869,752 A | 2/1999 | Klauber et al. |
| 6,629,512 B2 | 10/2003 | Iwatani et al. |
| 6,945,035 B2 | 9/2005 | Hirooka et al. |
| 7,556,117 B2 | 7/2009 | Browne et al. |
| 8,918,264 B2 * | 12/2014 | Jegu ...................... F01D 21/003 701/100 |

(Continued)

FOREIGN PATENT DOCUMENTS

EP    2161479 A1    3/2010

OTHER PUBLICATIONS

Jehlik, F. et al., "Simulated Real-World Energy Impacts of a Thermally Sensitive Powertrain Considering Viscous Losses and Enrichment," SAE International Journal of Materials and Manufacturing, vol. 8, No. 2, May 2015, Available Online Apr. 14, 2015, 12 pages.

*Primary Examiner* — Hai H Huynh
(74) *Attorney, Agent, or Firm* — Geoffrey Brumbaugh; McCoy Russell LLP (57) ABSTRACT

Methods and systems are provided for diagnosing an engine thermal encapsulation positioned around a powertrain of a vehicle. In one example, degradation of the thermal encapsulation may be determined by comparing a temperature sampled via a sensor during engine off condition with an expected temperature.

20 Claims, 4 Drawing Sheets

(56) References Cited

U.S. PATENT DOCUMENTS

| | | | |
|---|---|---|---|
| 2010/0011789 A1* | 1/2010 | Carlson | B60H 1/004 |
| | | | 62/158 |
| 2013/0255604 A1 | 10/2013 | Rollinger et al. | |
| 2016/0010613 A1* | 1/2016 | O'Brien | F01P 3/00 |
| | | | 123/179.3 |
| 2017/0167595 A1* | 6/2017 | Cole | F16H 57/0417 |
| 2017/0233103 A1* | 8/2017 | Teicholz | B64D 27/16 |
| | | | 701/100 |
| 2018/0023484 A1* | 1/2018 | Gelwan | B64D 27/10 |
| 2018/0230946 A1* | 8/2018 | Virtue, Jr. | F02K 3/075 |

* cited by examiner

THERMAL ENGINE ENCAPSULATION DIAGNOSTIC

FIELD

The present description relates generally to methods and systems for diagnosing a thermal encapsulation around a powertrain of a vehicle.

BACKGROUND/SUMMARY

Engine temperature closely relates to engine performance. During engine operation, engine temperature is monitored and controlled to ensure high fuel efficiency, reduced exhaust emission, and reduced friction loss. During engine cold start, fuel enrichment and/or spark retardation may be implemented in order to activate exhaust catalyst. During engine and transmission warm-up, high viscosity of lubricants causes increased friction. As a result, fuel consumption and exhaust emissions may be negatively impacted at low powertrain temperature. Accordingly, various approaches have been developed to reduce thermal losses from the powertrain.

One example approach is shown by Linden in U.S. Pat. No. 4,924,818. Therein, the engine or engine components are surrounded by a radiant heat retardant material to maintain the engine near operating temperatures for extended periods of time after engine shutdown, so that engine may start at a higher temperature in the subsequent restart.

However, the inventors herein have recognized potential issues with such systems. As one example, the heat retardant material may degrade or lose integrity over time. As another example, thermal encapsulation material may be removed for access to the powertrain during service, and the material may be damaged or the technician may fail to replace some pieces, causing degradation of the encapsulation system. The degradation may result in the loss of its ability to retain engine heat. Vehicle performance may further be impaired if the engine is operated with parameters configured under intact engine insulation.

In one example, the issues described above may be addressed by a method for diagnosing degradation of a thermal encapsulation positioned around a powertrain of a vehicle. The method comprising: sampling a temperature, via a sensor positioned onboard a vehicle driven by a powertrain having an engine, during an engine off condition; and indicating degradation of a thermal encapsulation positioned at least partially around the powertrain responsive to a temperature difference between the sampled temperature and an expected temperature. In this way, thermal encapsulation degradation may be promptly identified and addressed.

As one example, a vehicle powertrain may be configured with a thermal encapsulation device. For example, each powertrain component, including the engine and the transmission, may include one or more insulating units. An actual temperature of a powertrain component may be sampled via one or more existing sensors (such as, coolant temperature sensor, transmission oil temperature sensor, engine oil temperature sensor, and air inlet temperature sensor) during engine off condition. The sampled temperature from each sensor may be curve fitted and compared with an expected temperature profile to generate a temperature difference. In one example, the expected temperature may be generated from a powertrain with the thermal encapsulation, and a threshold may be generated from a prototype powertrain without one or more pieces of the thermal encapsulation. In another example, the expected temperature may be generated from a powertrain without thermal encapsulation. Degradation of the thermal encapsulation may be determined by comparing the temperature difference with the threshold.

As another example, actual temperature of a powertrain component may be sampled via one or more existing sensors (such as, coolant temperature sensor, transmission oil temperature sensor, engine oil temperature sensor, and air inlet temperature sensor) during engine on conditions in addition to or instead of during engine off conditions. Temperature differences between the sampled temperature and an expected temperature for each sensor under each operating condition may be calculated. Degradation of the thermal encapsulation material may be calculated based on a weighted average of the temperature differences, wherein each temperature difference may be weighted based on location of the sensor and the operating condition. Some types of degradation of or damage to the thermal encapsulation system may be more reliably detected during engine warm-up (engine on) than during engine cool-down (engine off).

In this way, thermal encapsulation degradation may be timely identified and addressed. By comparing a sampled actual temperature with an expected temperature, engine temperature excursions resulting from damage or loss of the encapsulation can be reliably identified using existing engine sensors. By sampling the temperature during engine off condition, effectiveness of the thermal encapsulation device is directly measured, and an accurate diagnosis of thermal encapsulation may be achieved. By calculating temperature differences based on multiple sensors under multiple operating conditions, thermal encapsulation degradation may be robustly determined. If degradation of the thermal encapsulation is detected, the system sets a diagnostic fault code and may turn on the Malfunction Indicator Light (MM).

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
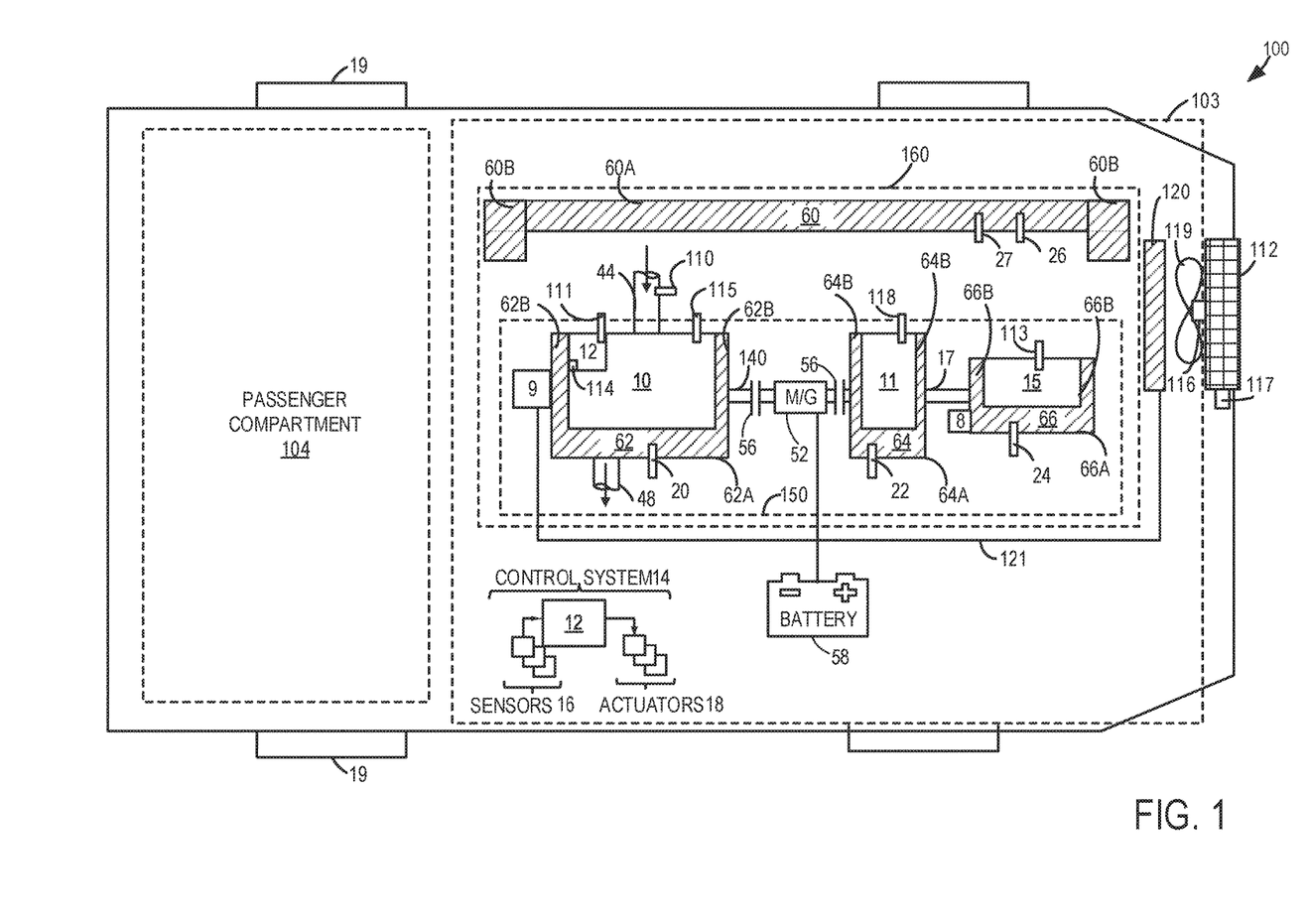
FIG. 1 illustrates an example vehicle powertrain including a thermal encapsulation.
Figure 2:
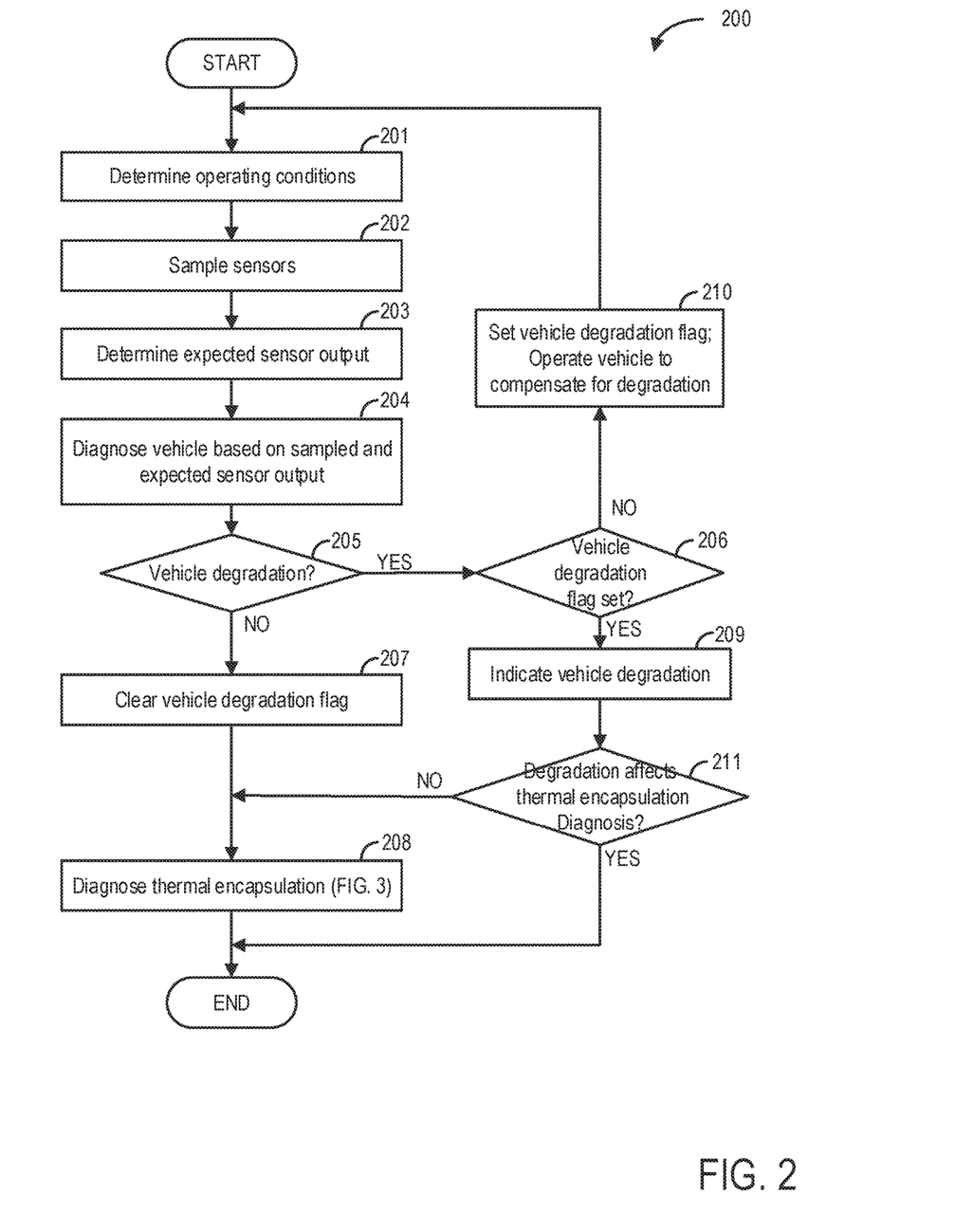
FIG. 2 is a high-level flowchart illustrating an example method for operating the example vehicle of FIG. 1.
Figure 3:
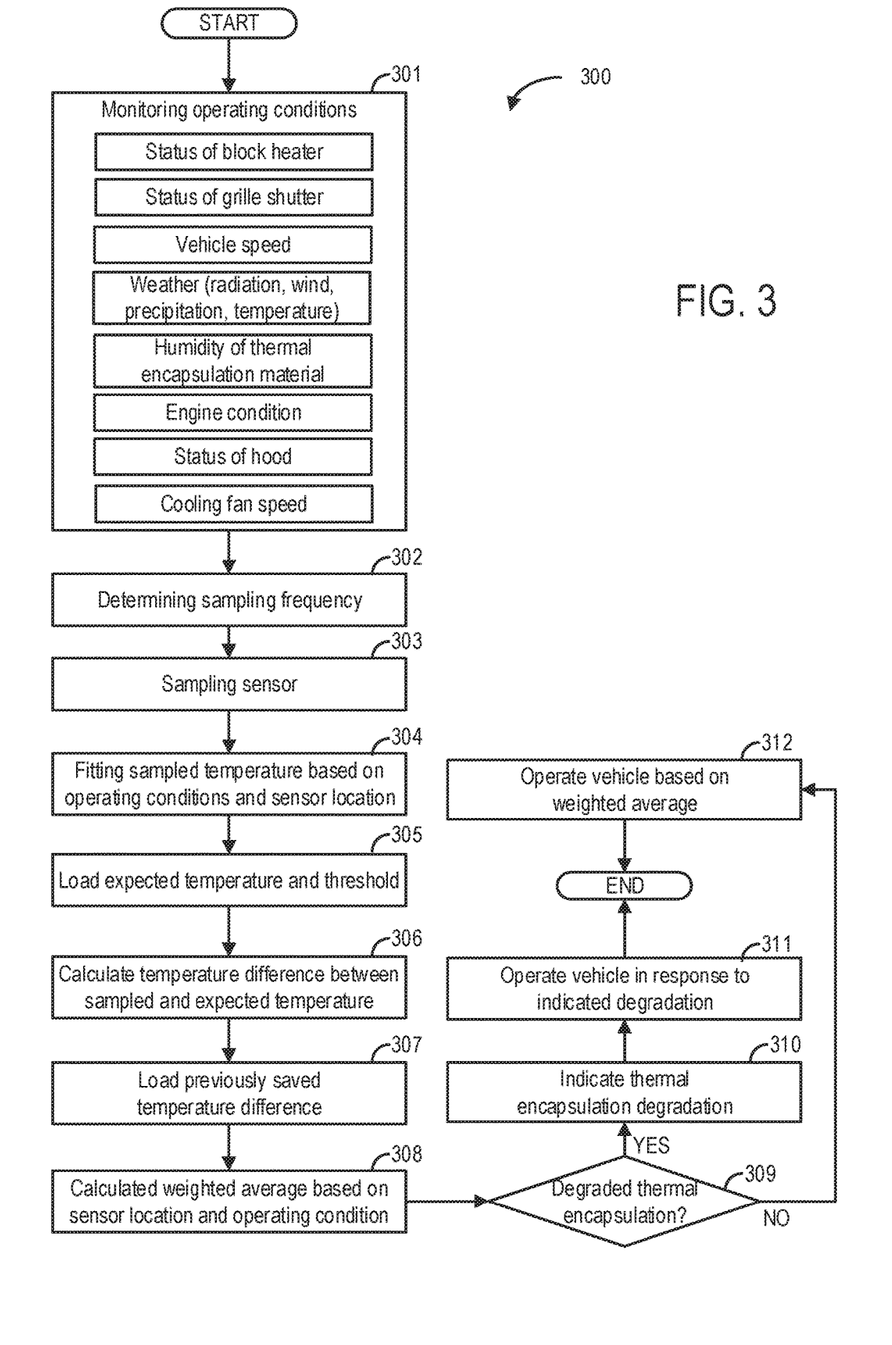
FIG. 3 is a flowchart illustrating an example method for diagnosing the thermal encapsulation.
Figure 4:
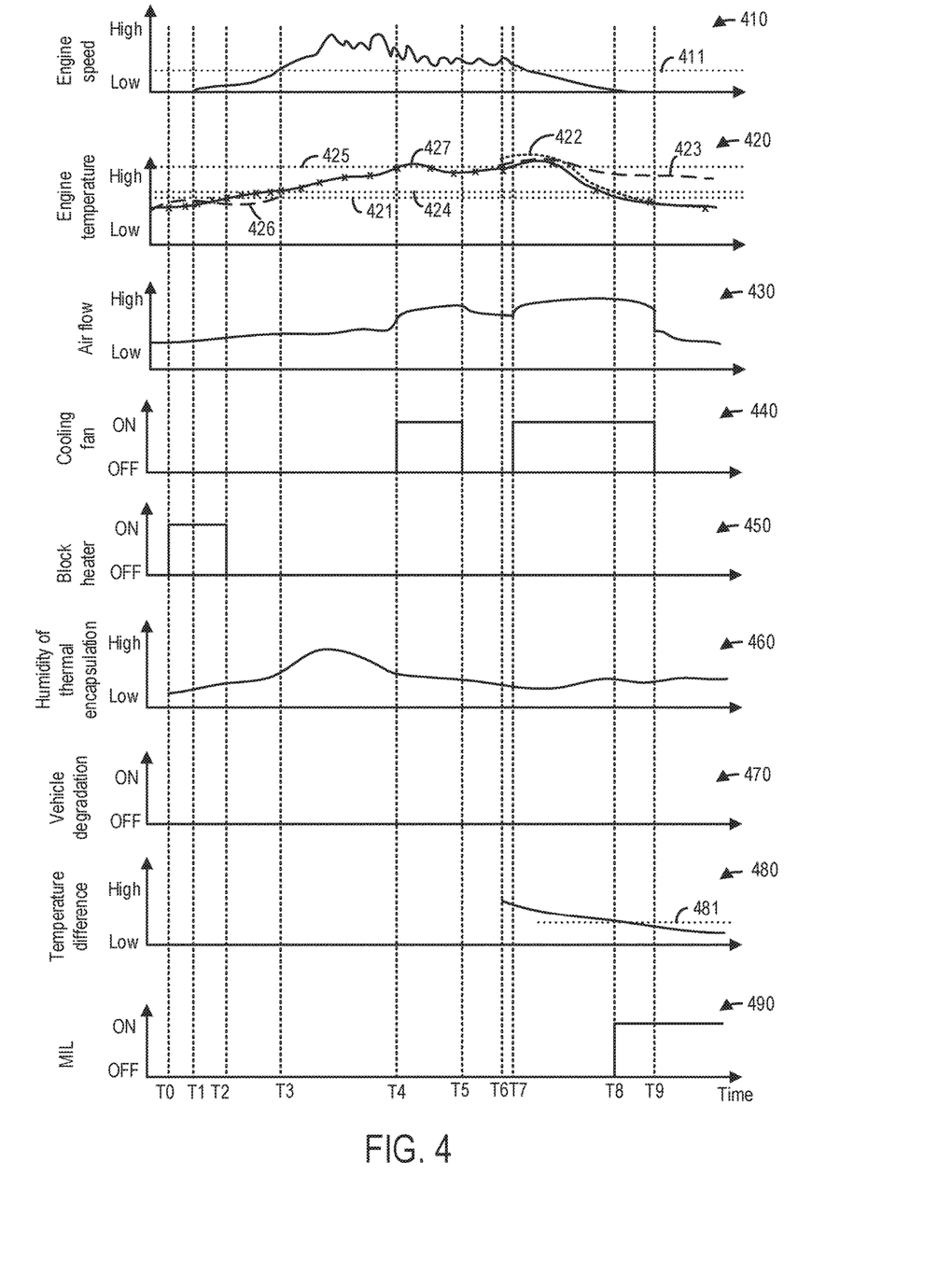
FIG. 4 shows a graph illustrating variations of vehicle operating parameters while implementing the methods of FIGS. 2-3.

The following description relates to systems and methods for diagnosing thermal encapsulation positioned at least partially around a powertrain of a vehicle. An example vehicle system with the thermal encapsulation for the powertrain is shown in FIG. 1. The vehicle system of FIG. 1 may be operated according to an example routine shown in FIG. 2. In particular, vehicle operation may be diagnosed and adjusted based on one or more sensor outputs. If no vehicle degradation is detected, status of the thermal encapsulation may be diagnosed. An example method for diagnosing thermal encapsulation degradation is shown in FIG. 3. Variations of vehicle operating parameters over time while implementing the methods of FIGS. 2-3 are shown in FIG. 4.

Referring to FIG. 1, an example embodiment of a vehicle system 100 including a vehicle powertrain 150 is shown. Vehicle system 100 has drive-wheels 19, a passenger compartment 104 (herein also referred to as a passenger cabin), and an under-hood compartment 103. Under-hood compartment 103 may house various under-hood engine components under a hood (not shown). For example, under-hood compartment 103 may house powertrain 150, which comprises of components including internal combustion engine 10 mechanically coupled to torque converter 11 and transmission 15. Powertrain 150 as illustrated and described herein may be included in a vehicle such as a road automobile, among other types of vehicles. While the example applications of powertrain 150 will be described with reference to a vehicle, it should be appreciated that various types of engines and vehicle propulsion systems may be used, including passenger cars, trucks, etc.

In some examples, vehicle 100 may be a hybrid vehicle with multiple sources of torque available to one or more vehicle wheels 19. In other examples, vehicle 100 is a conventional vehicle with only an engine, or an electric vehicle with only electric machine(s). In the example shown, vehicle 100 includes engine 10 and an electric machine 52. Electric machine 52 may be a motor or a motor/generator. Crankshaft 140 of engine 10 and electric machine 52 are connected via torque converter 11 and transmission 15 to vehicle wheels 19 when one or more clutches 56 are engaged. In the depicted example, a first clutch 56 is provided between crankshaft 140 and electric machine 52, and a second clutch 56 is provided between electric machine 52 and torque converter 11. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from torque converter 11 and the components connected thereto. The powertrain may be configured in various manners including as a parallel, a series, or a series-parallel hybrid vehicle.

Electric machine 52 receives electrical power from a traction battery 58 to provide torque to vehicle wheels 19. Electric machine 52 may also be operated as a generator to provide electrical power to charge battery 58, for example during a braking operation.

Internal combustion engine 10 has a combustion chamber which may receive intake air via intake passage 44 and may exhaust combustion gases via exhaust passage 48. Engine oil may be provided as a lubricant for reducing friction between moving components within the internal combustion engine 10. Temperature of the engine oil may be determined by engine oil sensor 115. In addition, an air intake temperature sensor 110 (also referred herein as air inlet temperature sensor) may provide intake air temperature in intake passage 44 such that an estimate for air density may be determined and a desired amount of fuel may be provided to produce stoichiometric air-to-fuel ratio.

The internal combustion engine 10 may be coupled to cooling system 13 that circulates coolant through internal combustion engine 10 to absorb waste heat, and distributes the heated coolant to radiator 120 and/or heater core (not shown). In one example, cooling system 13 may be coupled to engine 10 and may circulate coolant throughout cooling sleeve of the engine via water pump 9. Water pump 9 may also circulate coolant to radiator 120 through passage 121. The temperature of the coolant may be monitored by temperature sensor 111. Further, the coolant temperature may be regulated by a thermostat (not shown), which may include a thermostat valve (not shown) located in the cooling line in the cooling system. The thermostat valve may remain closed until coolant reaches a threshold temperature, thereby limiting coolant flow through the radiator until the threshold temperature is reached. Further, in order to increase the engine temperature, coolant flow may be adjusted such that it flows through the heater core where heat may be transferred from the heater core to the coolant (also referred herein as heated coolant). The heated coolant may raise the engine temperature during engine restart. Alternatively, during engine cold-start conditions, thermostat valve may be closed to stagnate a small amount of coolant in cooling line. This allows coolant to be stagnated at the engine block, heater core, and cylinder heads, further assisting in engine warm-up. A block heater 114 may be coupled to internal combustion engine 10 for heating up the engine during cold start. In one example, the block heater 114 may be coupled to the cooling system 13 for warming up the coolant.

Torque converter 11 may include a bypass clutch (not shown). The bypass clutch can either be engaged, disengaged, or partially engaged. When the clutch is either disengaged or being disengaged, the torque converter is said to be in an unlocked state. Temperature of the torque converter may be measured by torque converter temperature sensor 118 coupled to torque convertor 11.

Transmission 15 transmits the rotation power generated from engine 10 to vehicle wheels 19. Transmission 15 may be a gearbox, a planetary gear system, or another type of transmission. In one embodiment, transmission 15 comprises an electronically controlled transmission with a plurality of selectable speed ratios. In addition, an engine-driven transmission fluid pump 8 may be in fluid communication with transmission 15. Engine-driven transmission fluid pump 8 may be configured to circulate transmission fluid (also referred herein as transmission oil) through an engine-driven pump fluid loop (not shown) to lubricate the components of transmission 15, thereby providing hydraulic pressure to engage the various gears and clutches. A temperature sensor 113 may be coupled to the fluid loop (not shown) of the transmission 15 and may provide an estimate of the transmission oil temperature. Transmission fluid pump 8 may be operated in accordance with torque converter 11, and may be driven by the rotation of the engine or transmission input shaft, for example. Thus, transmission fluid pump 8 may operate during engine running conditions only. Furthermore, the hydraulic pressure generated in engine-driven transmission fluid pump 8 may increase as an engine speed increases, and may decrease as an engine speed decreases.

Further, one or more blowers and cooling fans may be included in under-hood compartment 103 to provide airflow assistance and augment a cooling airflow through the under-hood components. For example, cooling fan 119 may be driven by actuator 116 to provide cooling airflow assistance through radiator 120. Cooling fan 119 may draw a cooling airflow into under-hood compartment 103 through an opening in the front-end of vehicle system 100, for example, through grille shutter system 112. Such a cooling air flow may then be utilized by radiator and other under-hood components (e.g., fuel system components, batteries, etc.) to keep the engine and/or transmission cool. In one example, grille shutter system 112 may be configured with a plurality of louvers (or fins, grilles, blades, or shutters). A position of the louvers may be adjusted via actuator 117 to control an airflow through the grille shutter system. The louvers may be movable between an opened position and a closed position, and may be maintained at either position or a plurality of intermediate positions thereof. By adjusting the louvers position (i.e. opening or closing) of grille shutter system 112, cooling or heating may be provided to the under-hood compartment 103. In one example, opening the louvers may provide cool air to flow into inner space (created between the powertrain and the insulating sub-units) and thus cooling powertrain 150. Thus, in this case, grille shutter system 112 may assist cooling system 13 in cooling powertrain 150. In another example, closing and/or partially closing louvers of the grille shutter system 112 may reduce the amount of airflow into the inner space, which, in turn, allows the temperature of powertrain 150, to be increased. In addition, the closing of the louvers may further decrease aerodynamic drag on the vehicle and thus may improve fuel economy.

Under-hood compartment 103 may include a thermal encapsulation device 160 positioned at least partially around components of powertrain 150 for retaining heat. By retaining heat with thermal encapsulation device 160, fuel economy may be improved as engine and/or transmission lubricant viscosity decreases with higher temperature. This may, in turn, lead to less mechanical frictions and less vehicle energy consumption. In addition, by improving the cold-start performance of a vehicle (i.e. with higher engine restart temperature), engine temperature may reach an operating temperature (such as, catalyst light-off temperature, minimum stop-start temperature, etc.) sooner, which may lead to less emission and better fuel efficiency. As such, thermal encapsulation device 160 may improve vehicle performance by extending engine cool down transient after engine shutdown event and thus, enabling warmer engine restart. In addition, thermal encapsulation device 160 may reduce the battery's exposure to heat resulting in more efficient battery operation and longer life. Similarly, reducing heat exposure of an air conditioner heat exchanger may result in more efficient operation of the air conditioner.

The thermal encapsulation device may comprise a single insulating unit 60 entirely or partially enclosing powertrain 150. In another embodiment, multiple insulating units entirely or partially enclosing each component or multiple components of powertrain 150. As an example, a first insulating unit 62 enclosing engine block of engine 10, a second insulating unit 64 enclosing torque converter 11, and a third insulating unit 66 enclosing transmission 15. The single insulating unit 60 may entirely enclose the powertrain 150, or may comprise of one or more sub-units, each sub-unit covering one or more of an upper portion, lateral portion, front portion, rear portion and lower portion of the powertrain 150. In the depicted example, single insulating unit 60 comprises of an upper insulating sub-unit 60A and lateral side units 60B. First insulating unit 62 comprises lower insulating sub-unit 62A and lateral side units 62B. Second insulating unit 64 comprises lower insulating sub-unit 64A and lateral side units 64B. Third insulating unit 66 comprises lower insulating sub-unit 66A and lateral side units 66B. Each of the first, second, and third insulating unit may entirely enclose the corresponding powertrain component, or may be composed of one or more sub-units covering distinct portions of the corresponding powertrain component. Still other combinations may be possible.

The thermal encapsulation device 160 may include a plurality of components designed to block air flow (convection) and/or reduce conductive and radiation heat losses. As such, thermal encapsulation device 160 may consist of a variety of materials including polymers, metals, ceramics, etc. Some thermal encapsulation components may serve multiple purposes such as a "belly pan" which improves aerodynamics during driving and reduces convective heat loss after engine shutdown.

The thermal encapsulation device 160 may be powertrain-mounted or body-mounted or a combination of both. Typically, powertrain-mounted thermal encapsulation device may be directly mounted to the powertrain 150 or each component of powertrain 150, via a bolted mounting bracket, plastic push retainers, rivets, welding, adhesive, or other suitable means (not shown), while body-mounted thermal encapsulation device may be directly mounted to or be part of the vehicle body or frame, such as the vehicle hood or vehicle underbody structure, via standard fastening methods, such as bolts and nuts, plastic push retainers, rivets, welding, adhesive, etc.

In one example, an engine-mounted thermal encapsulation device may consist of one or more sub-units molded to the shape of the entire powertrain 150 or to the shape of each component of powertrain 150. In yet another example, the one or more sub-units may consist of insulated materials laminated to a pre-shaped piece of rust-inhibited steel or aluminum that follows the outline of either, powertrain 150 or each of component of powertrain 150. It may be desirable for the sub-units of the engine-mounted thermal encapsulation device to be molded with a larger dimension than the powertrain 150 or each of component of 150, such that an inner space may be formed around the thermal encapsulated powertrain to allow airflow and thus, prevent engine overheating. In one example, the inner space may be at least 1 mm wide. In another example, the inner space may be set within a range, such as 5-8 mm, so that an air gap may be formed to further provide a sound absorption layer and/or radiative heat transfer barrier between the thermal encapsulation device 160 and the powertrain 150.

For example, an engine-mounted thermal encapsulation device may include an upper insulating sub-unit disposed at an upper portion of powertrain 150 to cover an upper portion of powertrain 150, as well as a lower insulating sub-unit disposed at a lower portion of the powertrain 150. The upper and lower insulating sub-units may each include extensions that cover the lateral sides of the powertrain. The extensions may be long enough to cover the entire length of a lateral side of powertrain 150, such that the lateral sides of the powertrain 150 are fully insulated. Alternatively, the extensions may not extend the entire length of the lateral sides of the powertrain 150, such that when the upper and lower insulating sub-units are assembled together, a gap without any insulating material is formed on the lateral sides of the powertrain. When assembled together, the upper and lower insulating sub-units may form an inner space between the powertrain 150 and the insulating materials of the upper and lower insulating sub-units as previously mentioned. The front and rear portion of the powertrain may not be covered by the insulating sub-units, such that an air passage may be formed at the front portion of the powertrain and allow cool air to flow to the inner space (created between the powertrain and the insulating sub-units) and out through an opening at the rear end of the encapsulation device.

The body-mounted thermal encapsulation device may consist of one or more sub-units mounted onto the vehicle frame or body components with standard fastening methods, such as bolts and nuts, plastic push retainers, rivets, welding, adhesive, etc. In one example, one of the sub-units (e.g. upper sub-unit) may be molded to conform to the shape of vehicle hood, while another sub-unit (e.g. lower sub-unit) may be molded to conform to the shape of the vehicle underbody structure. In one example, the size of the sub-units may be confined either to the size of the powertrain 150 or to each component of powertrain 150. In one example, the upper sub-unit may be fixed to the region of the vehicle hood directly above the powertrain, while the lower sub-unit may be fixed to the region of the vehicle underbody structure directly below the powertrain. In yet another example, body-mounted thermal encapsulation device may consist of existing vehicle components, such as hoodliner or under engine shield, which are lined or laminated with heat insulating materials. By adding a thermal encapsulating functions to the existing vehicle components, a body-mounted encapsulation may be realized without adding new components.

In addition, powertrain 150 may be enclosed with a combination of body-mounted and engine-mounted insulating material. As one example, FIG. 1 shows the lower portion of each component of the powertrain encapsulated with engine-mounted thermal encapsulation device, such that as first insulating unit 62 is coupled to lower portion of cylinder block of engine 10, second insulating unit 64 is coupled to lower portion of torque converter 11, and third insulating unit 66 is coupled to the lower portion of transmission 15. The upper portion of powertrain 150 is encapsulated with a body-mounted thermal encapsulation device, made up of a single insulating unit 60.

By encapsulating powertrain 150 with thermal encapsulation device 160, more heat may be retained within the engine when the engine is turned off. As a result, during a subsequent engine restart, engine temperature may reach an operating temperature sooner, which leads to less emission and better fuel efficiency. As one example, by encapsulating the powertrain such that a gap is provided between the upper and lower insulating units, an open space may be created around the powertrain which allows for air flow.

Temperature of the powertrain components may be monitored by sensors located throughout the powertrain. In one embodiment, the sensor is a temperature sensor in direct contact with the powertrain component. In another embodiment, the sensor measures the powertrain component temperature without direct contact. For example, the sensor may be an infrared camera for imaging the temperature distribution of the powertrain component. The sensors may include coolant temperature sensor 111 coupled to cooling system 13, engine oil temperature sensor 115, transmission oil temperature sensor 113, and torque converter temperature sensor 118. In another embodiment, multiple sensors may be used to measure temperature of one powertrain component. For example, multiple temperatures sensors may be distributed at various locations of the cylinder block for measuring the cylinder block temperature distribution. In another example, temperature distribution of the powertrain component may be imaged with a camera.

One or more temperature sensors may distributed throughout the thermal encapsulation device for measuring temperature of the thermal encapsulation. In one embodiment, one or more temperature sensors embedded within or adhered on the surface of the thermal encapsulation or the insulating unit. As one example, sensors 20, 22, 24, and 26 are thermally coupled to thermal insulating units 62, 64, 66, and 60, respectively. Sensors 20, 22, 24, and 26 may be wired or wireless temperature sensors providing corresponding temperature signals to control system 14. As another example, the sensors may sense the temperature of a thermal encapsulation without direct contact. In another embodiment, multiple sensors may be positioned at different locations of the thermal encapsulation or an insulating unit to measure the temperature distribution. As one example, multiple sensors may be evenly distributed throughout the entire thermal encapsulation device 160. As another example, temperature distribution of thermal encapsulation device 160 or a thermal insulating unit (for example, unit 62, 64, 66, or 60) may be indirectly imaged, for example, by a camera.

One or more humidity sensor 27 may be positioned within or in contact with the thermal encapsulation device or one or more of the thermal insulating units for sensing humidity or water content of the thermal encapsulation.

The vehicle system 100 comprises a control system 14. Control system 14 may be communicatively coupled to various components of engine 10 to carry out the control routines and actions described herein. As shown in FIG. 1, control system 14 may include an electronic digital controller 12. Controller 12 may be a microcomputer, including a microprocessor unit, input/output ports, an electronic storage medium for executable programs and calibration values, random access memory, keep alive memory, and a data bus. As an example, controller 12 may receive inputs from a plurality of sensors 16 and actuate a plurality of actuators 18. Sensors 16 may sense one or more of transmission gear position, gas pedal input, brake input, transmission selector position, vehicle speed, engine speed, mass airflow through the engine, and ambient temperature. Sensors 16 may also sense thermal encapsulation unit temperature, coolant temperature, engine oil temperature, transmission oil temperature sensor, air inlet temperature, and torque converter temperature. The plurality of actuators 18 may include but not limited to engine actuators (such as fuel injectors, an electronically controlled intake air throttle plate, and spark plugs), cooling system actuators (such as the various valves of the cooling system 13 and water pump 9), transmission fluid pump 8, grille shutter actuator 117, and cooling fan actuator 116.

In addition, controller 12 may receive information from a telematics device. The telematics device may facilitate integration of certain telecommunication functions within the system. For example, a navigation system within the vehicle may be included in the telematics device. The vehicle positional information may be provided by global positioning systems (GPS) included in the navigation system, for example. The telematics device may also be in communication with the weather satellite, such that weather information relating to cloud cover, wind speed, wind direction, precipitation, humidity, solar radiation, and ambient temperature may be provided to the vehicle control system.

As such, the controller 12 receives signals from the various sensors of FIG. 1 and the telematics device, and employs the various actuators of FIG. 1 to adjust engine operation based on the received signals and instructions stored on a memory of the controller. For example, adjusting coolant temperature may include adjusting air flow through radiator 120 by adjusting actuator 116 of cooling fan 119.

FIG. 2 shows an example method 200 for operating a vehicle (such as vehicle 100 of FIG. 1). Vehicle operating parameters may be adjusted based on outputs from sensors located throughout the vehicle system. Further, components of the vehicle other than the thermal encapsulation may be diagnosed based on the sensor outputs. As one example, the one or more sensors may be used for monitoring temperatures of various vehicle components, such as powertrain components shown in FIG. 1. The vehicle may be operated and diagnosed based on a temperature difference between the measured temperature and an expected temperature. After confirming that the vehicle operates properly and there is no vehicle component degradation affecting thermal encapsulation diagnosis, thermal encapsulation positioned at least partially around the powertrain may be diagnosed. As one example, the same sensors used for vehicle operating parameter adjustment and vehicle diagnosis may be used for diagnosing thermal encapsulation. As another example, thermal encapsulation may be diagnosed using different sensors from those used for vehicle operating parameter adjustment and vehicle diagnosis. Procedures for thermal encapsulation diagnosis are presented in detail in FIG. 3. By diagnosing vehicle components other than the thermal encapsulation before diagnosing the thermal encapsulation itself, thermal encapsulation degradation may be accurately identified as vehicle component degradation may affect thermal encapsulation diagnosis. For example, degraded grille shutter or degraded engine coolant thermal stat may affect the powertrain temperature and lead to false positive in thermal encapsulation diagnosis.

Instructions for carrying out method 200 and the rest of the methods included herein may be executed by a controller based on instructions stored on a memory of the controller and in conjunction with signals received from sensors of the engine system, such as the sensors described above with reference to FIG. 1. The controller may employ engine actuators of the engine system to adjust engine operation, according to the methods described below.

At 201, method 200 includes estimating vehicle and engine operating conditions. Operating conditions may be estimated, measured, and/or inferred, and may include one or more vehicle conditions, such as vehicle speed, vehicle location, etc., various engine operating conditions, such as engine status (e.g., engine-on or -off), engine load, driver torque demand, engine speed, air-to-fuel (A/F) ratio, etc., various fuel system conditions, such as fuel level, fuel type, fuel temperature, etc., as well as external environmental conditions, such as ambient temperature, ambient humidity, barometric pressure, wind speed, wind direction, and precipitation.

At 202, method 200 samples one or more sensors arranged throughout the vehicle system. In one embodiment, method 200 may sample the sensors to determine temperatures of various vehicle components. As one example, method 200 may sample the sensors to determine the temperature or temperature distribution of various powertrain components. For example, coolant temperature may be sensed via coolant temperature sensor (such as sensor 111 of FIG. 1); engine oil temperature may be sensed by engine oil temperature sensor (such as sensor 115 of FIG. 1); and transmission oil temperature may be sensed by transmission oil temperature sensor (such as sensor 113 of FIG. 1).

At 203, an expected sensor output of the sampled sensor is determined. In one embodiment, method 200 may load a predetermined expected sensor output based on vehicle and engine operating conditions determined at 201. In another embodiment, method 200 may model the expected sensor output based on vehicle and engine operating conditions determined at 201. As one example, the expected sensor output may be determined assuming there is no degradation in the thermal encapsulation device. As another example, the sensor is for measuring a temperature, and the expected sensor output may be an expected temperature.

At 204, method 200 diagnoses the vehicle based on sampled sensor output from 202 and expected sensor output from 204. As an example, vehicle operation may be diagnosed based on a difference between the sampled and expected sensor outputs. Degradation of the vehicle component other than the thermal encapsulation may be determined responsive to the difference greater than a threshold. As an example, vehicle operation may be diagnosed based on a temperature difference between the sampled temperature and the expected temperature.

At 205, method 200 determines whether a component of the vehicle other than the thermal encapsulation is degraded. As one example, method 200 may check whether degradation of the vehicle component is determined at 204. In another example, method 200 may determine vehicle component degradation directly from sensor output. In yet another example, method 200 may determine vehicle component degradation based on operator input. If no vehicle component degradation is detected, method 200 moves to 207, wherein the vehicle degradation flag is cleared. Otherwise, method 200 moves to 206.

At 206, method 200 checks if the degradation flag for the degraded component was set. If the answer is YES, method 200 moves to 209 to indicate the vehicle component degradation. As one example, degradation of the vehicle component may be indicated to an operator by turning on an indicator related to the component via the controller 12. If no degradation flag for the vehicle has set, method 200 moves to 210 to set the vehicle degradation flag. Further, method 200 adjusts vehicle operating parameters to compensate or mitigate the degradation. As one example, controller 12 may adjust vehicle operating parameters based on the difference between the sampled and expected sensor output from 204. For example, in response to an increased difference, controller 12 may increase the magnitude of adjustment to the one or more corresponding vehicle operating parameters.

At 208, method 200 diagnoses status of the thermal encapsulation according to method 300 presented in detail in FIG. 3.

At 211, method 200 may optionally determine if the degradation of the vehicle component affects the diagnosis of the thermal encapsulation or insulating units. In one embodiment, a vehicle degradation may affect thermal encapsulation diagnosis if the degraded vehicle component affects the operation of the thermal encapsulation or the powertrain. If vehicle component degradation does not affect thermal encapsulation diagnosis, method 200 may move to 208. Otherwise, method 200 exits. For example, the thermal encapsulation is diagnosed only after confirming the grille shutter is not degraded. As another example, the thermal encapsulation is diagnosed only after confirming engine coolant thermostat is not degraded.

Method 200 may be periodically performed, such as at least once per drive cycle, after a predetermined number of miles have been driven, or after a predetermined duration of engine operation.

FIG. 3 shows method 300 for diagnosing the status of thermal encapsulation positioned at least partially around a powertrain of a vehicle (such as thermal encapsulation device 160 of FIG. 1). Thermal encapsulation of the powertrain may degrade and loose the heat retaining capability due to degradation or breach of the insulation material. Degraded thermal encapsulation may impair engine fuel efficiency and exhaust emission. As one example, diagnosis of the thermal encapsulation may be implemented if the vehicle is operating properly and no vehicle degradation is detected. As another example, diagnosis of the thermal encapsulation may be implemented if degraded vehicle component does not affect the thermal encapsulation diagnosis process.

Degradation of the thermal encapsulation material may be determined based on data acquired by sampling temperature of the powertrain component and/or temperature of the thermal encapsulation. Specifically, temperature differences between sampled temperature and an expected temperature may be calculated. In one example, the expected temperature may be determined assuming the powertrain operated with or without the thermal encapsulation device. Thermal encapsulation degradation may be determined responsive to a weighted average of the temperature differences from one or more sensors under one or more vehicle operating conditions. As one example, the weighted average may be calculated by multiplying each temperature difference with a weighting factor based on sensor location and vehicle operating condition.

At 301, vehicle operating conditions are monitored. As an example, the operating conditions may be measured or estimated based on various sensors located throughout the vehicle system. In one embodiment, one or more of the status of a block heater, the status of the grille shutter, vehicle speed, weather (including solar radiation, winds speed and direction, precipitation, and ambient temperature), humidity of the thermal encapsulation material, engine operating condition (engine speed, engine load, coolant temperature, etc.), status of vehicle hood, cooling fan speed may be monitored. As one example, status of the block heater may include temperature of the block heater. As another example, status of the grille shutter may include the angle of the grille shutter. As another example, weather information such as temperature, wind speed, wind direction, humidity, and precipitation may be acquired by a telematics device. As another example, humidity of the thermal encapsulation material may be directly measured by a sensor coupled to the thermal encapsulation device (such as sensor 27 of FIG. 1). As another example, humidity of the thermal encapsulation material may be estimated based on weather information (such as humidity and precipitation and ambient temperature), engine condition (such as engine temperature and engine speed), and air flow through the thermal encapsulation material. The air flow through the thermal encapsulation material may be estimated based on vehicle speed, wind direction and speed, status of the grille shutter, and cooling fan speed. As yet another example, status of the vehicle hood may be determined by a sensor coupled to the hood.

At 302, method 300 determines a sampling frequency of a temperature based on vehicle operating conditions. The sampling frequency may decrease with decreased expected temporal change of the temperature. As one example, the sampling frequency may be lower during engine off than the sampling frequency during engine running condition. As another example, the sampling frequency during engine off may increase at higher wind speeds. As yet another example, the sampling frequency during engine running may increase at higher engine speeds and/or at higher vehicle speeds.

At 303, the sensor output is sampled at the frequency determined at 301. As one example, the sensor may sense powertrain component temperature. As another example, the sensor may sense thermal encapsulation device temperature. As yet another example, the sensor may be the same sensor used for diagnosing vehicle in method 200 of FIG. 2. By using the same sensor for thermal encapsulation diagnosis and vehicle diagnosis/operation, no additional equipment is required for thermal encapsulation diagnosis.

At 304, the sampled sensor output from 303 is fitted with a curve to generate a sampled temperature profile. As one example, the sampled temperature may be fitted based on vehicle operating conditions monitored at 301. As another example, sampled temperature may be fitted with a curve based on thermal conduction and thermal convection. The curve may be an exponential or polynomial curve. In one embodiment, the curve may be determined depending on the relative importance among thermal conduction, natural thermal convection, forced thermal convection (air flow through the thermal encapsulation device), and radiative heat transfer. The relative importance may be determined based on operating conditions. As one example, during engine off, the sampled temperature may be fitted with an exponential decay curve. As another example, during engine start, the sampled temperature may be fitted with a polynomial curve. As yet another example, the relative importance may be determined based on sensor location. For example, forced thermal convection may dominant, thus considered more important, if the sensor locates near the grille shutter.

In one embodiment, the fitted curve may include terms that depend on operating conditions determined at 301. As an example, the curve fitting may include multipliers, exponents, polynomial factors, etc. based on one or more of ambient temperature, wind speed, wind direction, air flow through the thermal encapsulation, solar radiation, and humidity of the thermal encapsulation material.

At 305, expected temperature and corresponding threshold may be loaded to the controller. For example, the expected temperature and the threshold may be generated from measurements and/or models of a powertrain with and without the thermal encapsulation. As another example, coefficients of a profile of the expected temperature may be loaded to the controller. The expected temperature profile may be determined by fitting the expected temperature with a curve, and the coefficients of the expected temperature profile may be the coefficients of the curve. The curve may be the same type of curve as in 304.

In one embodiment, the expected temperature may be generated from measurements and/or models of a powertrain with the thermal encapsulation. The threshold may be generated from measurements and/or models of a powertrain with and without thermal encapsulation.

In another embodiment, the expected temperature may be generated by sampling the sensors of a prototype vehicle under the same operating condition as monitored at 301. As one example, the sensors of the prototype vehicle locate at the same location as sampled sensors at 303. As another example, the expected temperature and thresholds may be generated by sampling the sensors of the prototype vehicle with and without thermal encapsulation. As another example, the expected temperature and thresholds may be generated by digital models of the vehicle with and without thermal encapsulation. In another embodiment, the expected temperature and threshold may be generated by combining sampled data from the prototype vehicle at a limited number of operating conditions, and digital models for the effects of a wide range of operating conditions. In one embodiment, the fitted curve of the expected temperature may be loaded from the memory of the controller.

In one embodiment, the loaded expected temperature may be adjusted based on vehicle operating conditions from 301 before comparing to the curve-fitted sampled temperature from 304. For example, the expected temperature at high thermal encapsulation humidity may be adjusted to a lower level, as the thermal conductivity of the thermal encapsulation around the engine increases with increased humidity. As another example, after decreasing the engine temperature due to high humidity, the expected temperature of the engine temperature may be adjusted to a higher level after a number of engine cycles, as engine combustion heat can dry the thermal encapsulation. In another embodiment, coefficients of the expected temperature profile may be adjusted based on vehicle operating conditions from 301.

At 306, temperature difference between the sampled temperature and the expected temperature are calculated. In one embodiment, the temperature difference may be calculated by subtracting the sampled temperature profile from the expected temperature profile. In another embodiment, the temperature difference may be calculated based on coefficients of the sampled temperature profile and coefficients of the expected temperature profile. For example, the temperature difference may be calculated by summing up the differences between each coefficients of the sampled and the expected temperature profiles. By calculating the temperature difference based on coefficients of the sampled and expected temperature profiles, signal to noise ratio of the temperature difference may be improved, and computational resources may be minimized.

At 307, method 300 loads previous calculated and saved temperature differences to the controller. The previous calculated temperature differences may be generated from other sensors at a different operating condition. For example, the temperature difference calculated at 306 may be based on data acquired from a first sensor, while the previous calculated temperature difference is based on data acquired from a second sensor located at a different location from the first sensor. As another example, the temperature difference calculated at 306 may be based on data acquired from a sensor located in the thermal encapsulation device at a first operating condition, while the previous calculated temperature difference is based on data acquired from the same sensor at a second, different, operating condition. As yet another example, the temperature difference calculated at 306 may be based on data acquired from a first sensor under a first operating condition, while the previous calculated temperature difference is based on data acquired from a second sensor located at a different location from the first sensor, and under a second, different, operating condition from the first condition.

At 308, a weighted average of the temperature differences is calculated. In one embodiment, the temperature differences may be weighted based on monitored vehicle operating conditions at 301. As an example, if the temperature differences is calculated based on expected temperatures of a powertrain with intact thermal encapsulation, greater temperature difference may indicate an increased likelihood of degradation. As such, the temperature difference under engine off condition may be assigned with a greater weighting factor than temperature difference under engine running or engine start condition, since the sampled temperature under engine off condition is a direct measurement of the desired function of the thermal encapsulation. The temperature difference under engine start condition may be assigned with a greater weighting factor than temperature difference under engine running condition, since the sampled temperature are affected by less factors during engine start. As another example, if the temperature difference is calculated based on expected temperatures of a powertrain without thermal encapsulation, lower temperature difference may indicate an increased likelihood of degradation. As such, the temperature difference under engine off condition may be assigned with a smaller weighting factor comparing to engine running and engine start condition, and the temperature difference under engine start condition may be assigned with a smaller weight factor comparing to engine running condition.

In another embodiment, the temperature differences may be weighted based on sensor location. For example, temperature difference related to sensor that can robustly measuring temperature of the powertrain or the thermal encapsulation may be considered more important for degradation diagnosis. In one example, the oil temperature sensor may more robustly measure the results of thermal encapsulation degradation, since it is directly related to oil viscosity and therefore friction and fuel economy. In another example, the coolant temperature sensor may more robustly measure the results of thermal encapsulation degradation, since it is directly related to minimum temperature for engine stop-start and therefore fuel economy.

At 309, method 300 compares the weighted average of the temperature differences with a threshold, and determines whether the thermal encapsulation is degraded. As an example, threshold may be loaded at 305. As another example, the threshold may be adjusted based on monitored vehicle operating conditions at 301. In one embodiment, if the expected temperature is determined from powertrain with thermal encapsulation, weighted average of the temperature difference higher than a threshold may indicate degradation. As such, the threshold may be higher for engine start condition than engine off condition, and higher for engine running condition than engine start condition. In another embodiment, if the expected temperature is determined from powertrain without thermal encapsulation, weighted average of the temperature difference lower than a threshold may indicate degradation. As such, the threshold may be lower for engine start condition than engine off condition, and lower for engine running condition than engine start condition. If thermal encapsulation degradation is determined, method 300 moves to 310. Otherwise, method moves to 312.

At 310, method 300 indicates thermal encapsulation degradation. As one example, a diagnostic code for the degraded thermal encapsulation device or insulating unit may be set. As another example, the MIL may be turned on to display degradation of the thermal encapsulation device or the insulating unit to the operator.

At 311, method 300 operate vehicle in response to the thermal encapsulation degradation. In one embodiment, vehicle operating parameters may be adjusted responsive to the degradation. For example, responsive to the degradation of thermal encapsulation, the block heater may be turned on for a longer duration during engine cold start. As another example, the estimated time needed for catalytic activity to occur (lite-off time) in a catalyst positioned in the engine exhaust may be altered in relation to the thermal encapsulation degradation. In response to this estimate, the exhaust air/fuel ratio of the mixture combusted by the engine during the lite off time may be maintained for a longer time period.

At 312, method 300 may operate the vehicle based on weighted average of the temperature difference. As an example, an increased weighted average may indicate the thermal encapsulation losing its ability to retain heat. The controller may increase fuel injection amount or retard ignition responsive to increased weighted average, wherein the amount of the adjustment in fuel injection amount or the retardation angle may be proportional to the weighted average. The block heater may be turned on for a longer duration during engine cold start to compensate for the heat loss.

FIG. 4 illustrates an example variation of vehicle operating parameters (engine speed 410, engine temperature 420, air flow through the thermal encapsulation 430, cooling fan status 440, block heater status 450, humidity of the thermal encapsulation material 460, vehicle degradation indication 470, weighted averages of the temperature differences 480, and MIL 490) over time while implementing method 200 of FIG. 2 and method 300 of FIG. 3. As an example, engine temperature may be sampled during various engine operating conditions including engine start (warm-up), engine running, and engine off (cool-down). As one example, the engine temperature may be sensed by a sensor. As another example, the engine temperature may be estimated based on data acquired via a sensor. The vehicle is diagnosed for degradation based on the sampled engine temperature during engine start. In response to no vehicle degradation, thermal encapsulation is diagnosed based on the sampled engine temperature during engine off. The x-axes of the graphs correspond to time and increase as indicated by the arrows. The y-axes of the graphs correspond to magnitude or status (ON/OFF) of the operating parameters.

At time T0, engine starts in response to an engine on command. As one example, the engine on command may be a key-on event. As another example, the engine on command may be sent by the controller. The engine starts to warm up in response to the engine on command. The block heater 450 may be turned on in response to the engine on command to warm up the engine. For example, the engine may be warmed up by heating the coolant via the block heater. The controller starts to sample the engine temperature as illustrated by the crosses in 420. The sampled engine temperature profile 427 may be determined by fitting the sampled engine temperature with a curve based on vehicle operating conditions.

The vehicle may be diagnosed based on the sampled engine temperature. For example, vehicle may be diagnosed based on a temperature difference between the sampled engine temperature and an expected engine temperature 426. The expected engine temperature 426 may be determined assuming intact thermal encapsulation. As one example, the expected engine temperature 426 may be predetermined on a powertrain prototype with intact thermal encapsulation. As another example, expected engine temperature 426 may be estimated based on a powertrain model with intact thermal encapsulation. The vehicle may be considered degraded responsive to the temperature difference between engine temperature profile 427 and expected temperature 426 higher than a threshold. Vehicle operating parameters may also be adjusted based on the difference between the sampled engine temperature and the expected engine temperature 426. Since the difference between the sampled engine temperature and the expected temperature is less than a threshold, no vehicle degradation is indicated in 470.

At T1, engine speed increases from zero. As one example, engine speed may increase responsive to engine temperature higher than a threshold. As another example, engine speed may increases from zero by cranking the engine via an electric machine (such as electric machine 52 of FIG. 1).

At T2, responsive to sampled engine temperature higher than threshold 421, the block heater is turned off. In another example, the block heater may be turned off after a predetermined time duration.

At T3, engine speed reaches threshold 411, and sampled engine temperature reaches threshold 424. As one example, from receiving engine on command at T0 to engine temperature reaching threshold temperature 424, the vehicle may be considered under the engine start (or warm-up) condition. As another example, from receiving engine on command to engine speed reaching a threshold 411, the vehicle may be considered under the engine start condition. From T0 to T3, as vehicle starts traveling from stop, if the grille shutter is open, air flow 430 through the thermal encapsulation increases. In one example, the engine is operated based on the sampled engine temperature after engine start.

At T4, responsive to engine temperature reaching threshold 425, the cooling fan is turned on to prevent engine overheating. Responsive to cooling fan operation, air flow through thermal encapsulation increases.

At T5, cooling fan is turned off. The cooling fan may be turned off responsive to engine temperature lower than a threshold. As another example, the cooling fan may be turned off after operating for a predetermined duration.

At T6, engine shutdown command is received. As one example, the engine shutdown command may be a key-off event. As another example, the engine shutdown command may be sent by the controller. The vehicle may be considered under engine running condition from T3 to receiving engine shutdown command at T6. The vehicle may be considered under engine off or engine cool-down condition after receiving engine shutdown command. During engine off, the engine temperature may be sampled with a sampling frequency lower than during engine on conditions.

Responsive to engine off condition, since no vehicle degradation is detected, the controller starts to diagnose the thermal encapsulation. In one embodiment, an expected engine temperature profile 422 and corresponding threshold 481 may be loaded to the controller. Different from expected engine temperature 426, expected engine temperature profile 422 and threshold 481 are determined assuming no thermal encapsulation. As an example, the expected engine temperature profile 422 is predetermined based on engine temperature measurement or model of a prototype powertrain system without thermal encapsulation. The expected engine temperature may be adjusted based on vehicle operating conditions. For example, the expected engine temperature may be adjusted based on air flow through the thermal encapsulation around the engine. The air flow may increase due to one or more of opened grill shutter, high wind speed, and operation of cooling fan. Degradation of the thermal encapsulation may be indicted by turning on MIL 490 if the temperature difference between the sampled engine temperature and the expected engine temperature profile 422 is lower than threshold 481.

In another embodiment, an expected engine temperature profile 423 and corresponding threshold (not shown) may be loaded to the controller. Similar to 426, expected engine temperature profile 423 and the threshold may be determined assuming intact thermal encapsulation around the engine. As such, thermal encapsulation degradation may be determined if the temperature difference is higher than the threshold.

In yet another embodiment, thermal encapsulation degradation may be indicated based on a weighted average of temperature differences determined during both engine start (warm-up) and engine off (cool-down) conditions. As one example, if the temperature difference is calculated based on expected engine temperature assuming intact thermal encapsulation (such as 426 and 423), the temperature difference during engine off condition may be assigned with a weighting factor greater than the weighting factor for the temperature difference calculated during engine start condition. In other words, temperature difference during engine off is considered being more related to thermal encapsulation degradation than temperature difference during engine start condition.

At T7, responsive to sampled engine temperature higher than a threshold, cooling fan is turned on to increase the air flow through the thermal encapsulation. The cooling fan may be turned off after a duration from T7 to T9.

At T8, responsive to weighted temperature difference lower than threshold 471, thermal encapsulation degradation is indicated via an indicator.

As an example, the thermal encapsulation is continuously diagnosed after engine stop (zero engine speed). As another example, the thermal encapsulation is continuously diagnosed after the vehicle is stopped (zero vehicle speed). As another example, sampling of the engine temperature may be stopped after a predetermined duration. As yet another example, sampling of the engine temperature may be stopped after the engine temperature lower than a threshold.

In this way, degradation of thermal encapsulation may be reliably and timely identified by comparing the sampled temperature with the expected temperature. The technical effect of using the same sensor for vehicle diagnosis and thermal encapsulation diagnosis is that thermal encapsulation degradation may be identified with existing sensors in the vehicle system. The technical effect of determining thermal encapsulation degradation during engine off condition is that temperature variation directly related to the heat retaining function of thermal encapsulation may be measured. The technical effect of determining thermal encapsulation based on temperature differences at more than one engine operating conditions is that the degradation may be robustly identified. The technical effect of determining the difference between the sampled temperature and the expected temperature sensor by comparing the coefficients of the fitting curve and the coefficients of the expected temperature is that the signal to noise ratio for degradation identification is increased, and lower computation intensity and storage resources are used. The technical effect of decreasing sampling frequency during engine off comparing to engine on (including engine start and engine running) condition is that less computation resources and less power is required. The technical effect of determining degradation of thermal encapsulation based on temperature sampled by multiple sensors located at different locations is that degradation may be identified reliably and robustly.

As one embodiment, a method includes sampling a temperature, via a sensor positioned onboard a vehicle driven by a powertrain having an engine, during an engine off condition; and indicating degradation of a thermal encapsulation positioned at least partially around the powertrain responsive to a temperature difference between the sampled temperature and an expected temperature. In a first example of the method, further includes fitting the sampled temperature with a curve based on thermal conduction and thermal convection. A second example of the method optionally includes calculating the temperature difference by comparing coefficients of the curve with coefficients of a profile of the expected temperature, wherein the expected temperature profile is determined by fitting the expected temperature. A third example of the method optionally includes one or more of the first and second examples, and further includes comprising fitting the sampled temperature based on vehicle conditions including one or more of status of a hood, status of a grille shutter, vehicle speed, humidity of the thermal encapsulation material, status of a cooling fan, status of a block heater, operating conditions of an engine, and weather. A fourth example of the method optionally includes one or more of the first through third examples, and further includes wherein the humidity of the thermal encapsulation material is estimated based on weather. A fifth example of the method optionally includes one or more of the first through fourth examples, and further includes fitting the sampled temperature based on sensor location. A sixth example of the method optionally includes one or more of the first through fifth examples, and further includes sampling a second temperature via a second sensor, and indicating degradation of the thermal encapsulation further in response to a second temperature difference between the second temperature and a second expected temperature. A seventh example of the method optionally includes one or more of the first through sixth examples, and further includes indicating degradation of the thermal encapsulation based on a weighted average of the first temperature difference and the second temperature difference, wherein the first and second temperature differences are weighted based on sensor location. A eighth example of the method optionally includes one or more of the first through seventh examples, and further includes generating the expected temperature from a second powertrain with a second thermal encapsulation position at least partially around the second powertrain, the second powertrain is a prototype powertrain or a model of the powertrain. A ninth example of the method optionally includes one or more of the first through eighth examples, and further includes generating the expected temperature from a second powertrain without thermal encapsulation, the second powertrain is a prototype powertrain or a model of the powertrain.

As another embodiment, a method includes during engine operation, diagnosing a vehicle for degradation based on a first temperature profile generated via a first sensor; in response to shutdown of an engine which propels the vehicle, indicating degradation of a thermal encapsulation positioned at least partially around a powertrain, which includes the engine, responsive to a temperature difference between a second temperature profile generated via a second sensor and an expected temperature profile; and operating the vehicle in response to the temperature difference. In a first example of the method, further includes during engine operation, operating the vehicle in response to the vehicle diagnosis. A second example of the method optionally includes the first example and further includes diagnosing vehicle components other than the thermal encapsulation during engine warm up. A third example of the method optionally includes one or more of the first and second examples, and further includes wherein the first sensor and the second sensor are the same sensor. A fourth example of the method optionally includes one or more of the first through third examples, and further includes indicating degradation of the thermal encapsulation responsive to a temperature difference between the first temperature profile and a second expected temperature profile.

As yet another embodiment, a vehicle system includes a thermal encapsulation at least partially enclosing a powertrain having an engine; a sensor; and a controller configured with computer readable instructions stored on a non-transitory memory for: during engine start, generating a first temperature profile via the sensor at a first frequency, and calculating a first temperature difference between the first sampled temperature profile and a first expected temperature profile; during engine shutdown, generating a second temperature profile via the sensor at a second frequency, and calculating a second temperature difference between the second temperature profile and a second expected temperature profile; and indicating degradation of the thermal encapsulation based on both the first temperature difference and the second temperature difference. In a first example of the system, wherein the controller is further configured for indicating the thermal encapsulation degradation based on weighted average of the first temperature difference and the second temperature difference, and the weighting factors for the first and second temperature differences are different. A second example of the system optionally includes the first example and further includes wherein the first frequency is higher than the second frequency. A third example of the method optionally includes one or more of the first and second examples, and further includes the controller is further configured for diagnosing vehicle components other than the thermal encapsulation based on the first temperature, and indicating degradation of the thermal encapsulation responsive to no degradation in vehicle components other than the thermal encapsulation. A fourth example of the method optionally includes one or more of the first through third examples, and further includes wherein the controller is further configured for adjusting vehicle operating parameters in response to indicated thermal encapsulation degradation.

In another representation, a method includes sampling a temperature, via a sensor positioned onboard a hybrid vehicle driven by a powertrain having an engine, during an engine off condition; and indicating degradation of a thermal encapsulation positioned at least partially around the powertrain responsive to a temperature difference between the sampled temperature and an expected temperature.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method comprising:
sampling a temperature, via a sensor positioned onboard a vehicle driven by a powertrain having an engine, during an engine off condition; and
indicating, via a controller, degradation of a thermal encapsulation positioned at least partially around the powertrain responsive to a temperature difference between the sampled temperature and an expected temperature.

2. The method of claim 1, further comprising fitting, via the controller, the sampled temperature with a curve based on thermal conduction and thermal convection.

3. The method of claim 2, further comprising calculating, via the controller, the temperature difference by comparing coefficients of the curve with coefficients of a profile of the expected temperature, wherein the expected temperature profile is determined by fitting the expected temperature.

4. The method of claim 1, further comprising fitting, via the controller, the sampled temperature based on vehicle conditions including one or more of status of a hood, status of a grille shutter, vehicle speed, humidity of the thermal encapsulation material, status of a cooling fan, status of a block heater, operating conditions of the engine, and weather.

5. The method of claim 4, wherein the humidity of the thermal encapsulation material is estimated based on weather.

6. The method of claim 1, further comprising fitting, via the controller, the sampled temperature based on sensor location.

7. The method of claim 1, wherein the temperature difference between the sampled temperature and the expected temperature is a first temperature difference, the method further comprising sampling a second temperature via a second sensor, and indicating, via the controller, degradation of the thermal encapsulation further in response to a second temperature difference between the second temperature and a second expected temperature.

8. The method of claim 7, further comprising indicating, via the controller, degradation of the thermal encapsulation based on a weighted average of the first temperature difference and the second temperature difference, wherein the first and second temperature differences are weighted based on sensor location.

9. The method of claim 1, further comprising generating, via the controller, the expected temperature from a second powertrain with a second thermal encapsulation position at least partially around the second powertrain, the second powertrain is a prototype powertrain or a model of the powertrain.

10. The method of claim 1, further comprising generating, via the controller, the expected temperature from a second powertrain without thermal encapsulation, the second powertrain is a prototype powertrain or a model of the powertrain.

11. A method comprising:
during engine operation, diagnosing, via a controller, a vehicle for degradation based on a first temperature profile generated via a first sensor;
in response to shutdown of an engine which propels the vehicle, indicating, via the controller, degradation of a thermal encapsulation positioned at least partially around a powertrain, which includes the engine, responsive to a temperature difference between a second temperature profile generated via a second sensor and an expected temperature profile; and
operating the vehicle in response to the temperature difference.

12. The method of claim 11, further comprising during engine operation, operating the vehicle in response to the vehicle diagnosis.

13. The method of claim 12, further comprising diagnosing, via the controller, vehicle components other than the thermal encapsulation during engine warm up.

14. The method of claim 11, wherein the first sensor and the second sensor are the same sensor.

15. The method of claim 11, further comprising indicating, via the controller, degradation of the thermal encapsulation responsive to a temperature difference between the first temperature profile and a second expected temperature profile.

16. A vehicle system, comprising:
a thermal encapsulation at least partially enclosing a powertrain having an engine;
a sensor; and
a controller configured with computer readable instructions stored on a non-transitory memory for:
during engine start, generating a first temperature profile via the sensor at a first frequency, and calculating a first temperature difference between the first generated temperature profile and a first expected temperature profile;
during engine shutdown, generating a second temperature profile via the sensor at a second frequency, and calculating a second temperature difference between the second temperature profile and a second expected temperature profile; and
indicating degradation of the thermal encapsulation based on both the first temperature difference and the second temperature difference.

17. The system of claim 16, wherein the controller is further configured for indicating the thermal encapsulation degradation based on a weighted average of the first temperature difference and the second temperature difference, and weighting factors for the first and second temperature differences are different.

18. The system of claim 16, wherein the first frequency is higher than the second frequency.

19. The system of claim 16, wherein the controller is further configured for diagnosing vehicle components other than the thermal encapsulation based on the first temperature profile, and indicating degradation of the thermal encapsulation responsive to no degradation in vehicle components other than the thermal encapsulation.

20. The system of claim 16, wherein the controller is further configured for adjusting vehicle operating parameters in response to indicated thermal encapsulation degradation.

* * * * *